Sept. 27, 1955 A. L. COLLINS 2,718,717
HYDRAULIC DREDGE PIPE
Filed Sept. 8, 1952
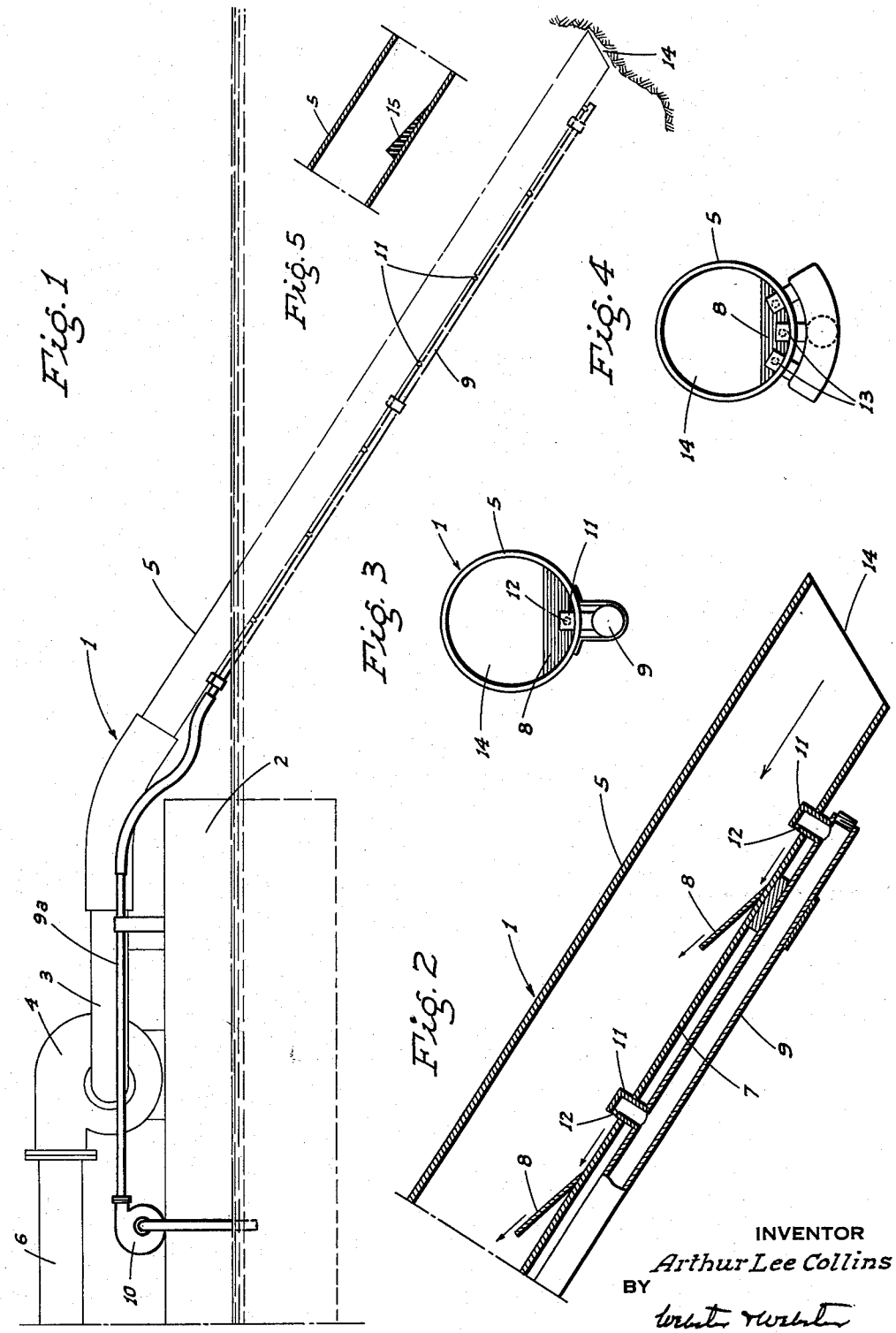
INVENTOR
Arthur Lee Collins
BY
ATTYS United States Patent Office 2,718,717
Patented Sept. 27, 1955

2,718,717
HYDRAULIC DREDGE PIPE
Arthur L. Collins, Berkeley, Calif.
Application September 8, 1952, Serial No. 308,434
1 Claim. (Cl. 37—61)

This invention relates to dredging systems wherein solids such as sand, gravel, and the like, are elevated by suction from a submerged river, lake or other bed, and transported to a spoils or stock area. Such a system consists essentially of a centrifugal power-driven pump, a suction intake pipe, and a positive pressure delivery pipe, all mounted on a barge or the like.

A portion at least of the intake pipe is of course disposed at an angle to the horizontal since it must extend from a point above water level to the underwater bed being dredged. This being the case, there is a tendency for the solids being sucked up with the water to fall to the lower side of the suction pipe instead of remaining in evenly distributed suspension in the pipe. Since a factor which to a large extent determines the amount of solids a dredge pump can recover from the submerged deposit is the dead weight of such solids, and the friction or resistance offered to the flow thereof, the above tendency of the solids to settle obviously decreases the output of the pump, especially when a long suction pipe is necessary.

The major object of my invention therefore is to increase the efficiency of a suction dredging system by the provision of a solids mixing device acting on the solids within the upwardly angled or sloping portion of the suction pipe, to cause such solids to be deflected upwardly from the bottom of the pipe with the flow of water, so that such solids will tend to be maintained in suspension in the upwardly flowing column of water.

A further object of the invention is to provide solids agitating means, acting in cooperation with the above recited mixing means, to agitate the solids tending to settle to the bottom of the pipe and throw such solids generally upward and into the water in the direction of flow thereof.

The amount of solids fed through the pump relative to the volume of water, is therefore increased over what is obtained with conventional dredge pipes, and the total output of solids in a given time is likewise increased, resulting in more efficient and faster dredging operations.

Still another object of the invention is to provide a hydraulic dredging system which is practical, reliable and durable, and one which is exceedingly effective for the purpose for which it is designed.

These objects are accomplished by means of such structure and relative arrangement of parts as will fully appear by a perusal of the following specification and claim.

In the drawings:
Fig. 1 is a fragmentary diagrammatic side outline of a suction dredge equipped with my improved suction pipe arrangement.
Fig. 2 is an enlarged sectional elevation of the lower portion of the suction pipe.
Fig. 3 is a lower end view of the pipe.
Fig. 4 is a similar view showing a modified jet arrangement.

Fig. 5 is a fragmentary section of the section pipe showing a modified form of deflector.

Referring now more particularly to the characters of reference on the drawings, the dredge suction pipe 1 is supported from a barge or other hull 2 in the usual manner and includes a substantially horizontal portion 3 connected to the intake of the suction pump 4 mounted on the hull, and a downwardly sloping intake portion 5, freely open at its lower end, and depending into the water to the bed from which the solids are to be drawn up.

The outlet pipe 6 from pump 4 is of course connected to the necessary conduits (not shown) leading to the spoils or stock area and on which the solids moved through the pump are deposited.

Secured in the depending portion 5 of pipe 1 and projecting upwardly from the bottom 7 thereof are longitudinally spaced segmental vanes or deflector plates 8, sloping upwardly from said bottom at a suitable angle in the direction of the upper end of said pipe and the pump 4. The spacing and number of the vanes depends on the length of portion 5 and as may be found most efficient.

Extending along and secured to the bottom of pipe portion 5 on the outside thereof is a high pressure manifold 9 connected to a pipe 9a leading from a suitable source of fluid pressure on the dredge such as a water pump 10 separate from the pump 4.

Projecting into pipe portion 5 through the bottom 7 thereof and connected to manifold 9 are jet nozzles 11 disposed radially of portion 5 some distance ahead—relative to the direction of flow through the pipe—of the vanes 8 and each provided with a jet opening 12 positioned to direct a high pressure stream against the adjacent vane near the bottom thereof.

One such nozzle may be provided for each vane, as shown in Fig. 3, or a number of such nozzles, circumferentially spaced but all directed against the adjacent vane, may be used as shown at 13 in Fig. 4.

In operation, pump 4 draws water and solids as an initially homogeneous mixture upwardly through the open lower end 14 of pipe portions 5, and since such portion is disposed at a slope, the action of gravity tends to cause the solids to settle toward and drag on the bottom 7 of said pipe portion 5.

Suction or pulling action of the water causes such settling solids to be carried up the sloping faces of the vanes and remixed with the flow of water so that the latter will continue to convey the solids upwardly along the pipe as is desired. This action of the vanes on the solids is aided by the high pressure jets, which exert a boosting action on the solids, pushing them up the vanes and thus supplementing the pulling action of the main column of water.

While there may be some loss in hydraulic friction due to the restricted areas in the pipe caused by the vanes, this is more than compensated for by the action of the high pressure jets.

While the above structure has its greatest value in the intake pipe of the suction pump, the same improved features may be advantageously used in the discharge pipe, in which case the vanes and booster jets would of course face away from the pump, but would remain in the same relation to the direction of flow as heretofore described.

While the vanes 8 are shown in Fig. 2 as being of metal plate, rubber vanes may be preferred as providing longer wear. In this case, the vanes would preferably be of wedge form, as shown at 15 in Fig. 5.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Letters Patent are desired:

In a suction dredge-pipe unit which comprises a dredge pipe open at its lower end and through which water and solids in normal suspension are drawn upwardly by suction, and a plurality of segmental vanes in and spaced lengthwise of the pipe and projecting upwardly from the bottom thereof in the direction of the upper end of the pipe; a separate relatively small high pressure pipe extending along the bottom of the dredge pipe on the outside thereof, and nozzles on said high pressure pipe passing through openings in the bottom of the dredge pipe into the same and disposed below the various vanes; the nozzles being provided with jet openings to direct high pressure fluid against the vanes; the nozzles being radially straight within the dredge pipe and of a diameter within said pipe no larger than the bottom openings thereof whereby the high pressure pipe with the nozzles thereon may be mounted on or disengaged from the dredge pipe without removing the nozzles.

References Cited in the file of this patent

UNITED STATES PATENTS

| | | |
|---|---|---|
| 909,543 | Carlesimo | Jan. 12, 1909 |
| 1,410,939 | McArdle | Mar. 28, 1922 |
| 1,844,635 | Caller | Feb. 9, 1932 |
| 2,191,424 | Cardinal | Feb. 20, 1940 |

FOREIGN PATENTS

| | | |
|---|---|---|
| 396,783 | France | Feb. 5, 1909 |
| 364,865 | Germany | Dec. 6, 1922 |